United States Patent
Yan

(10) Patent No.: US 11,530,726 B2
(45) Date of Patent: Dec. 20, 2022

(54) ROBOT CLEANER HAVING A FAN BRAKE DEVICE

(71) Applicant: Jason Yan, New Taipei (TW)

(72) Inventor: Jason Yan, New Taipei (TW)

(*) Notice: Subject to any disclaimer, the term of this patent is extended or adjusted under 35 U.S.C. 154(b) by 490 days.

(21) Appl. No.: 16/750,334

(22) Filed: Jan. 23, 2020

(65) Prior Publication Data
US 2021/0148423 A1 May 20, 2021

(30) Foreign Application Priority Data
Nov. 18, 2019 (TW) ................... 108141743

(51) Int. Cl.
*F16D 65/04* (2006.01)
*A47L 9/22* (2006.01)

(52) U.S. Cl.
CPC ............... *F16D 65/04* (2013.01); *A47L 9/22* (2013.01); *A47L 2201/00* (2013.01)

(58) Field of Classification Search
CPC .......... F16D 65/04; F16D 59/00; F16D 59/02; F16D 2121/16; A47L 9/22; A47L 9/2842; A47L 2201/00; A47L 2201/021
USPC .......................................... 15/300.1; 188/166
See application file for complete search history.

(56) References Cited

U.S. PATENT DOCUMENTS 3,575,527 A * 4/1971 Watanabe ............. F04D 29/052
416/169 R
2018/0231074 A1* 8/2018 Sun ..................... F04D 25/0613

* cited by examiner

*Primary Examiner* — Joseph J Hail
*Assistant Examiner* — Robert C Moore
(74) *Attorney, Agent, or Firm* — Muncy, Geissler, Olds & Lowe, P.C.

(57) ABSTRACT

A robot cleaner having a fan brake device is provided, which includes a main cleaner body having an accommodating slot used to contain a dust box and a fan, and at least one brake device is disposed inside the accommodating slot. The brake device is disposed at a notch on the bottom of the dust box for the fan to be inserted into, and under the junction line between the notch and the bottom edge of the dust box. Therefore, when the dust box is taken off from the main cleaner body, the flexible element of the brake device can press a soft stopper upward and then the soft stopper presses against the bottom of the fan blade of the fan to stop the fan.

5 Claims, 2 Drawing Sheets

ROBOT CLEANER HAVING A FAN BRAKE DEVICE

BACKGROUND OF THE INVENTION

1. Field of the Invention

The present invention relates to a robot cleaner, in particular to a robot cleaner having a fan brake device.

2. Description of the Prior Art

A robot cleaner is a cleaning device capable of moving on a floor in order to clean the floor. The bottom of the robot cleaner is provided with a cleaning brush, which can collect dust on the floor which the robot cleaner passed and the dust can be drawn from the suction nozzle on the bottom of the robot cleaner to the dust box inside the robot cleaner.

Currently, the fan of most robot cleaners is disposed between the suction nozzle and the dust box in order to draw the dust into the dust box via the suction power generated by the fan. However, when the user wants to replace the dust box, the robot cleaner should be completely turned off before the user takes off the dust box in order to prevent from the danger resulting from the fan keeping rotating after the dust box is taken off.

As described above, the currently available robot cleaners still have a lot of problems. Therefore, the inventor of the present invention has been involved in research into the solutions for the above problems for many years in order to solve these problems. Finally, the inventor of the present invention successfully develops a robot cleaner having a fan brake device capable of solving these problems.

SUMMARY OF THE INVENTION

So as to solve the above problems, the present invention provides a robot cleaner having a fan brake device, which can actively stop the fan when the user takes off the dust box.

To achieve the foregoing objective, the robot cleaner provided by the present invention includes a main cleaner body, a dust box and at least one brake device.

The main cleaner body has an accommodating slot disposed thereon and a fan is disposed in the accommodating slot. The dust box is disposed in the accommodating slot; the dust box has a notch disposed at the center of the bottom of the dust box and extending upward for the fan to be inserted into. The brake device is disposed in the accommodating slot and under the junction line of the notch of the dust box and the bottom edge of the dust box. The brake device includes a flexible element and a soft stopper; one end of the flexible element is fixed on the bottom surface of the accommodating slot and the other end of the flexible element is connected to one end of the soft stopper.

In one embodiment, the flexible element is a spring, a flexible sleeve or other flexible elements, and the soft stopper is a rubber block or a brake pad.

In one embodiment, the notch of the dust box has a dust inlet disposed thereon.

In one embodiment, the robot cleaner further includes a pair of fixing structures disposed on the outer wall surface of the dust box and the peripheral wall surface of the accommodating slot respectively.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION OF THE PREFERRED EMBODIMENT

The following description is about embodiments of the present invention; however it is not intended to limit the scope of the present invention.

Figure 1:
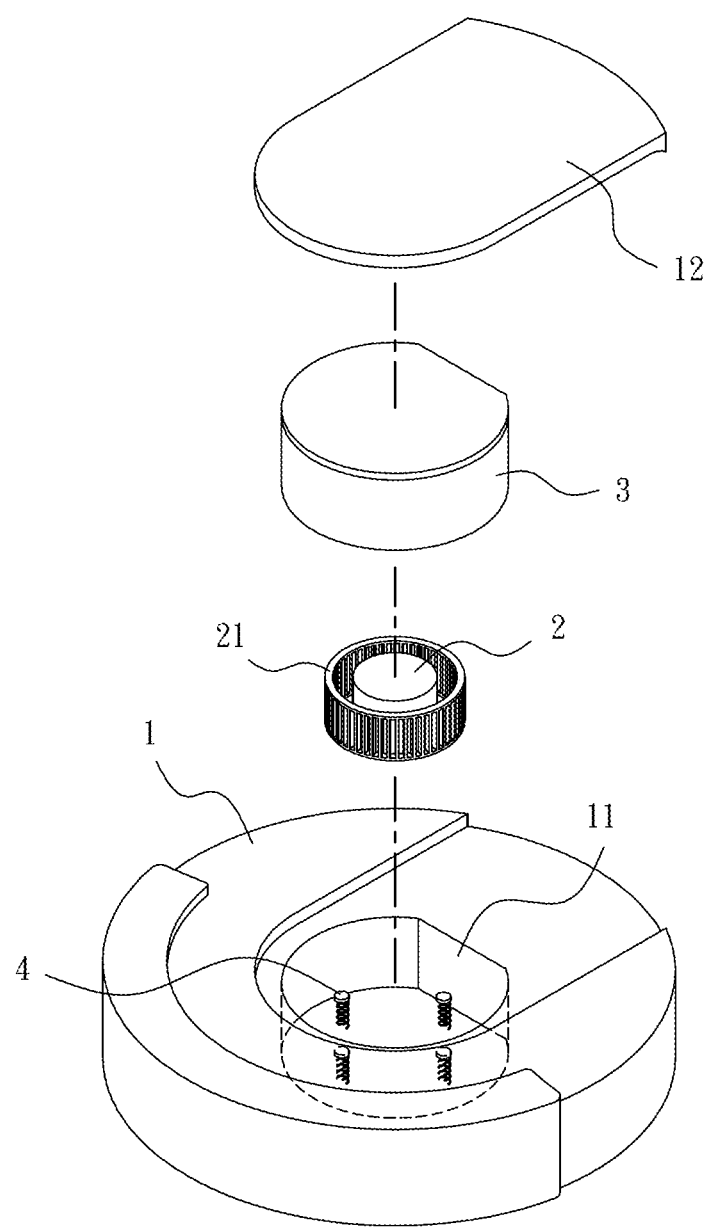
FIG. 1 is the exploded view of the robot cleaner in accordance with one embodiment in accordance with the present invention.
Figure 2:
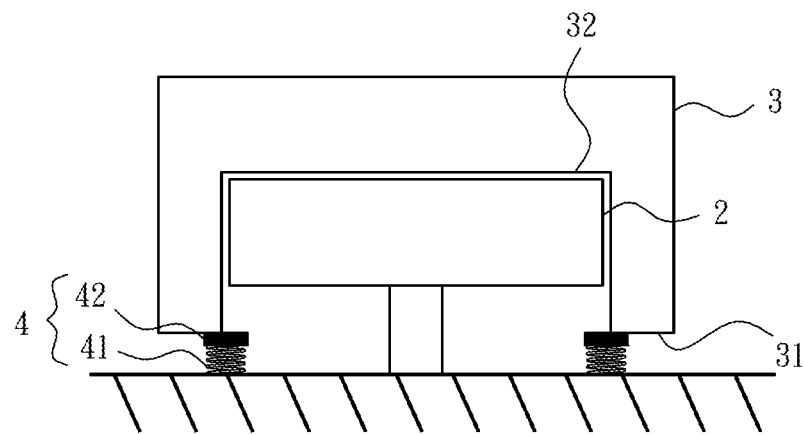
FIG. 2 is the side view showing the relation between the dust box, the fan and the brake device in accordance with one embodiment in accordance with the present invention.
Figure 3:
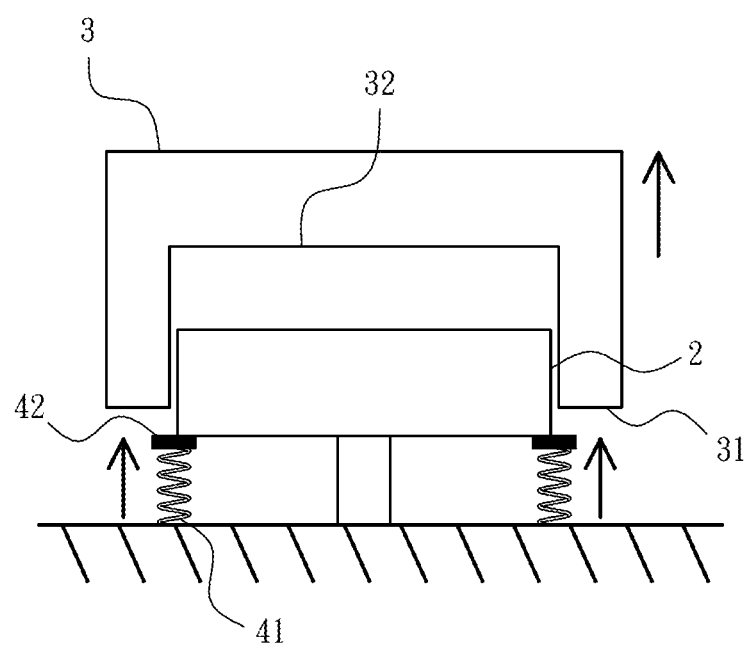
FIG. 3 is the schematic view of the operation status of the dust box, the fan and the brake device in accordance with one embodiment in accordance with the present invention.

Please refer to FIG. 1~FIG. 3; the robot cleaner according to the present invention mainly includes a main cleaner body 1, a fan 2, a dust box 3 and at least one brake device 4. The main cleaner body 1 has an accommodating slot 11 disposed thereon and the main cleaner body 1 further has a cover body 12 for capping the accommodating slot 11. The fan 2 is disposed inside the accommodating slot 11 and the fan 2 is connected to suction nozzle on the bottom of the main cleaner body 1 (not shown in the drawings). Besides, in the embodiment, the fan 2 is a turbo fan having a turbine blade.

The dust box 3 is installed inside the accommodating slot 11 and there is a notch 32, extending upward, at the center of the bottom of the dust box 3. The notch 32 is used for the fan 2 is inserted into when the dust box 3 is disposed on the accommodating slot 11; besides, the notch 32 has an opening (not shown in the drawings). Besides, when the fan 2 is inserted into the notch 32 of the dust box 3, the fan blade 21 of the fan 2 is adjacent to the wall surface of the peripheral of the notch 32.

Besides, in the embodiment, the robot cleaner includes 4 brake devices 4 in total and all of these brake devices 4 are disposed at the bottom of the accommodating slot 1,1 arranged around the center of the accommodating slot 11 in a regular interval, and disposed under the junction line between the notch 32 of the dust box 3 and the bottom edge of the dust box 11. More specifically, each of the brake devices 4 includes a flexible element 41 and a soft stopper 42. In the embodiment, the flexible element 41 is a spring and the soft stopper 42 is a rubber block. One end of the flexible element 41 is fixed at the bottom of the accommodating slot 11 and the other end of the flexible element 41 is connected to the soft stopper 42.

According to the robot cleaner having fan brake device of the present invention, when the dust box 3 is installed inside the accommodating slot 11, the bottom 31 of the dust box 3 can press the brake devices 4 downward. In the meanwhile, the fan 2 can draw the dust on the floor via the suction nozzle by the suction force generated by the fan 2 when the main cleaner body 1 is moving, and then the dust can be transported from the opening of the dust box 3 to the dust box 3. When the user wants to replace or clean the dust box 3, the user can directly open the cover body 12 of the main cleaner body 1 and then remove the dust box 3. Meanwhile, as the dust box 3, pressing the brake devices 4, is removed, the flexible elements 41 stretch because the elastic force thereof and then flexible elements 41 push the soft stoppers 42 upward; in this way, the soft stoppers 42 can press against the bottom of the fan blade 21 of the fan. At the moment, as the soft stoppers 42 are made of rubber, the friction force between the soft stoppers 42 and the fan blade 21 can be further enhanced; thus, the fan 3 can be stopped accordingly.

Afterward, when the user re-installs the cleaned dust box 3 or a new dust box 3 into the accommodating slot 11, the user can use the bottom 31 of the dust box 3 to press the brake devices 4 downward, so the soft stoppers 42 move downward and then leave from the bottom of the fan blade 21 of the fan 2. In this way, the fan 2 can start to rotate and generate suction force again to draw the dust from the suction nozzle to the dust box 3.

As described above, according to the robot cleaner having fan brake device of the present invention, when the dust box 3 is removed, the flexible elements 41 of the brake devices 4 can press the soft stoppers 42 upward via the elastic force thereof, so the soft stoppers 42 can press against the bottom of the fan blade 21 of the fan 2 in order to stop the fan 2. The above mechanism can avoid that the user is injured by the fan 2 because the fan 2 keeps rotating after the dust box 3 is removed. Besides, according to the robot cleaner having fan brake device of the present invention, when the dust box 3 is re-installed in the accommodating slot 11 of the main cleaner body 1, the bottom 31 of the dust box 3 can press the brake devices 4 downward, so the fan 2 can rotate again after being separated from the soft stoppers 42. Thus, the robot cleaner according to the present invention is not only of simple structure, but also can effectively avoid that the user gets injured because the fan 2 keeps rotating after the dust box 3 is removed. In addition, the robot cleaner having fan brake device of the present invention can further include a pair of fixing structures (not shown in the drawings) disposed on the outer wall surface of the dust box 3 and the peripheral wall surface of the accommodating slot 11 respectively. The fixing structures can effectively avoid that the dust box 3 is pushed back by the elastic force of the flexible elements 41 when the dust box 3 presses the brake devices 4 downward.

The above disclosure is related to the detailed technical contents and inventive features thereof. Those skilled in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A robot cleaner having a fan brake device, comprising:
    a main cleaner body, having an accommodating slot disposed thereon, and a fan being disposed in the accommodating slot;
    a dust box, disposed in the accommodating slot and having a notch, disposed at a center of a bottom of the dust box and extending upward, for the fan to be inserted into;
    at least one brake device, comprising a flexible element and a soft stopper, wherein one end of the flexible element is fixed on a bottom surface of the accommodating slot and the other end of the flexible element is connected to one end of the soft stopper, and the other end, opposite to the flexible element, of the soft stopper is disposed under a junction line of a bottom edge of the dust box and the notch.

2. The robot cleaner having the fan brake device of claim 1, wherein the flexible element is a spring or a flexible sleeve.

3. The robot cleaner having the fan brake device of claim 1, wherein the soft stopper is a rubber block or a brake pad.

4. The robot cleaner having the fan brake device of claim 1, wherein the fan is a turbo fan or an axial fan.

5. The robot cleaner having the fan brake device of claim 1, wherein when the fan is inserted into the notch of the dust box, a fan blade of the fan is close to a wall surface of a peripheral of the notch.

\* \* \* \* \*